US009473497B1

United States Patent
Smith (10) Patent No.: US 9,473,497 B1
(45) Date of Patent: Oct. 18, 2016

(54) EXCLUSION ENGINE FOR ELECTRONIC COMMUNICATIONS IN CONTROLLED-ENVIRONMENT FACILITIES

(71) Applicant: Securus Technologies, Inc., Dallas, TX (US)

(72) Inventor: Matthew Richard Smith, McKinney, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 13/910,629

(22) Filed: Jun. 5, 2013

(51) Int. Cl.
*H04L 29/06* (2006.01)

(52) U.S. Cl.
CPC .................... *H04L 63/10* (2013.01)

(58) Field of Classification Search
CPC ....................................................... H04L 63/10
See application file for complete search history.

(56) References Cited

U.S. PATENT DOCUMENTS

| | | | |
|---|---|---|---|
| 7,805,457 B1* | 9/2010 | Viola et al. | 707/769 |
| 7,860,722 B1* | 12/2010 | Chow | 705/1.1 |
| 2005/0144279 A1* | 6/2005 | Wexelblat | 709/225 |
| 2007/0041517 A1* | 2/2007 | Clarke et al. | 379/67.1 |
| 2008/0039053 A1* | 2/2008 | Polozola et al. | 455/412.2 |
| 2008/0040780 A1* | 2/2008 | Reinhold | 726/5 |
| 2009/0164919 A1* | 6/2009 | Bates et al. | 715/757 |
| 2013/0263227 A1* | 10/2013 | Gongaware et al. | 726/4 |
| 2014/0218466 A1* | 8/2014 | Bloms et al. | 348/14.09 |
| 2014/0267540 A1* | 9/2014 | Torgersrud | 348/14.01 |
| 2014/0270126 A1* | 9/2014 | Torgersrud et al. | 379/189 |
| 2014/0280631 A1* | 9/2014 | Torgersrud | 709/206 |
| 2014/0280632 A1* | 9/2014 | Torgersrud et al. | 709/206 |

\* cited by examiner

*Primary Examiner* — Jeffrey Pwu
*Assistant Examiner* — William Corum, Jr.
(74) *Attorney, Agent, or Firm* — Fogarty, L.L.C.

(57) ABSTRACT

An exclusion engine for electronic communications in controlled-environment facilities. In some embodiments, a method may include method may include receiving, at one or more computer systems, a request for an electronic communication between a resident and a non-resident of a controlled-environment facility and determining, via the one or more computer systems, whether an exclusion list adopted by the controlled-environment facility allows the non-resident to communicate with the resident, where the exclusion list is of a type selected from the group consisting of: a permissive list, and a restrictive list. For example, a permissive list may identify one or more non-residents that are allowed to communicate with the resident, and a restrictive list may identify one or more non-residents that are not allowed to communicate with the resident.

20 Claims, 5 Drawing Sheets

EXCLUSION ENGINE FOR ELECTRONIC COMMUNICATIONS IN CONTROLLED-ENVIRONMENT FACILITIES

TECHNICAL FIELD

This specification relates to electronic communications, and, more specifically, to an exclusion engine for electronic communications in controlled-environment facilities.

BACKGROUND

In the United States, prison inmates have certain visitation rights. By allowing prisoners to have some contact with the outside world while incarcerated, the justice system aims to facilitate their transition back into society upon release. Traditional forms of contact include telephone calls, in-person visitation, etc. More recently, technological advances have allowed jails and prisons to provide other types of communication, including videoconferences and electronic chat sessions.

There are currently no restrictions in scheduling electronic communication appointments for a specific prison. Generally speaking, a requestor can book an appointment with any inmate within any prison and at any time.

SUMMARY

Embodiments disclosed herein are directed to an exclusion engine for electronic communications in controlled-environment facilities. In an illustrative, non-limiting embodiment, a method may include receiving, at one or more computer systems, a request for an electronic communication between a resident and a non-resident of a controlled-environment facility, and determining, via the one or more computer systems, whether an exclusion list adopted by the controlled-environment facility allows the non-resident to communicate with the resident, where the exclusion list is of a type selected from the group consisting of: a permissive list, and a restrictive list. For example, the controlled-environment facility may be a jail or prison, the resident may be an inmate, and the electronic communication may be selected from the group consisting of: a telephone call, a video visitation session, an electronic chat session, a video telephone call, a text message, a prerecorded video message, and an email.

In some implementations, the exclusion list may be a permissive list that identifies one or more non-residents that are allowed to communicate with the resident. In that case, the method may include, in response to the non-resident being identified in the permissive list, determining whether the exclusion list allows the non-resident to communicate with the resident. Additionally or alternatively, the method may include, in response to the non-resident not being identified in the permissive list, determining whether the exclusion list allows the non-resident to communicate with the resident includes determining that the exclusion list does not allow the non-resident to communicate with the resident.

In other implementations, the exclusion list may be a restrictive list that identifies one or more non-residents that are not allowed to communicate with the resident. In that case, the method may include, in response to the non-resident being identified in the restrictive list, determining whether the exclusion list allows the non-resident to communicate with the resident. The method may further include, in response to the non-resident not being identified in the restrictive list, determining whether the exclusion list allows the non-resident to communicate with the resident includes determining that the exclusion list allows the non-resident to communicate with the resident.

The method may also include, creating, via the one or more computer systems, an exclusion list for each resident of the controlled-environment facility, each exclusion list being of the same type. Additionally or alternatively, the method may include creating, via the one or more computer systems, exclusion lists for a plurality of residents of the controlled-environment facility, a first portion of the plurality of residents associated with one or more permissive lists, and a second portion of the residents associated with one or more restrictive lists.

In some cases, at least one of the exclusion lists may be shared between two or more of the plurality of residents. For example, the two or more of the plurality of residents may have one or more common characteristics selected from the group consisting of: a gang affiliation, a family relationship, a friendship, a reason for incarceration in the controlled-environment facility, and a location of incarceration within the controlled-environment facility.

In some embodiments, a method may include creating, via the one or more computer systems, two or more exclusion lists for the resident of the controlled-environment facility, a first exclusion list associated with a first type of electronic communication and a second exclusion list associated with a second type of electronic communication. For instance, the method may include identifying the communication as the first type of communication and, in response to the determination, notifying at least one of the resident or non-resident whether the communication has been allowed. The method may also include, in response to the first type of communication not having been allowed, determining, via the one or more computer systems, that the second exclusion list allows the non-resident to communicate with the resident, and notifying at least one of the resident or the non-resident that the second type of electronic communication is allowed.

In another illustrative, non-limiting embodiment, a method may include receiving a request for an electronic communication between a resident and a non-resident of a controlled-environment facility, determining whether an exclusion list adopted by the controlled-environment facility allows the non-resident to communicate with the resident, transmitting an indication of the determination to personnel of the controlled-environment facility, receiving an indication of a revision to the exclusion list made by the personnel, and modifying the exclusion list according to the revision.

For example, the exclusion list may be of a type selected from the group consisting of: a permissive list, and a restrictive list. The permissive list may identify one or more non-residents that are allowed to communicate with the resident, and the restrictive list may identify one or more non-residents that are not allowed to communicate with the resident.

In yet another illustrative, non-limiting embodiment, a method may include transmitting a request for an electronic communication between a resident and a non-resident of a controlled-environment facility and receiving a notification of a determination of whether an exclusion list adopted by the controlled-environment facility allows the non-resident to communicate with the resident, where the exclusion list is of a type selected from the group consisting of: a permissive list, and a restrictive list.

In various embodiments, one or more of the operations described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses an exclusion engine for electronic communications in controlled-environment facilities. The operations described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Figure 1:
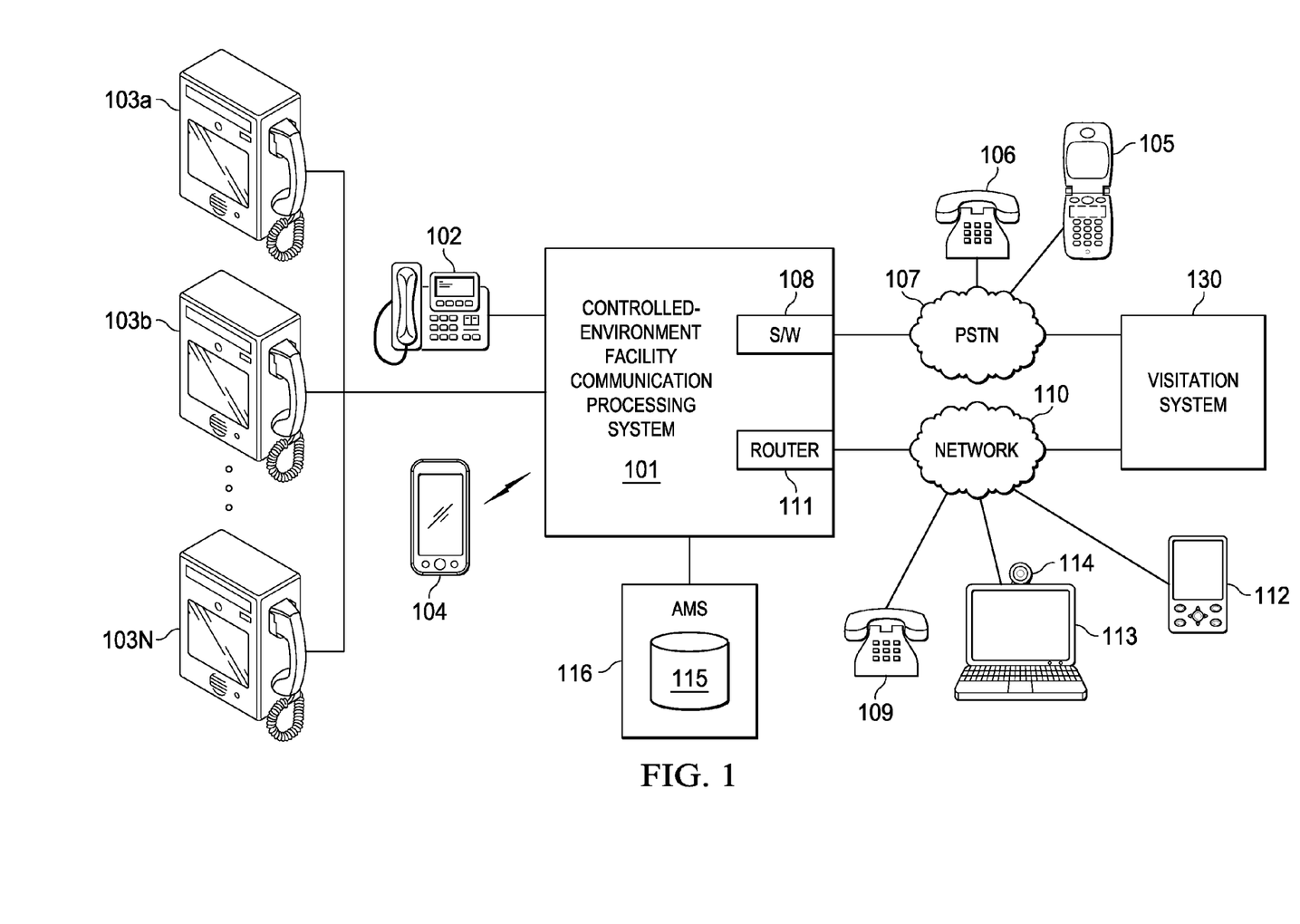
FIG. 1 is a block diagram of an example of an environment where a visitation system having an exclusion engine may be used according to some embodiments.

Turning now to FIG. 1, a block diagram of an illustrative environment where a visitation system having an exclusion engine may be used is depicted according to some embodiments. As shown, communication processing system 101 may provide telephone services, videoconferencing, online chat, and other electronic communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103a-n (referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to facilitating certain visitation and electronic communication operations, communication processing system 101 may be coupled to AMS 116, which in turn may be configured to store inmate or resident profile data (RPD) and other information in database 115.

For example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation or electronic communication services such as, for example, video visitation, telephone visitation, online chat, email, etc., for residents and non-residents of a controlled-environment facility. Although certain embodiments described herein relate specifically to video visitation, it should be noted that visitation system 130 may be used in conjunction with communication system 101 to facilitate any of the aforementioned types of electronic communications.

To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within communication system 101.

In some implementations, visitation system 130 may be configured to provide an exclusion engine for electronic communications such as, for example, video visitation, etc., as discussed in more detail below. In scenarios where visitation system 130 is located within the controlled-environment facility, it may have direct access to AMS 116. In other embodiments, however, visitation system 130 may be located remotely with respect to the controlled-environment facility, and access to AMS 116 may be obtained via a computer network such as, for example, network 110.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be an suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities. When such videoconferencing capabilities are missing, video visitation devices 103 may still be used to facilitate email communications, online chats, etc.

Figure 2:
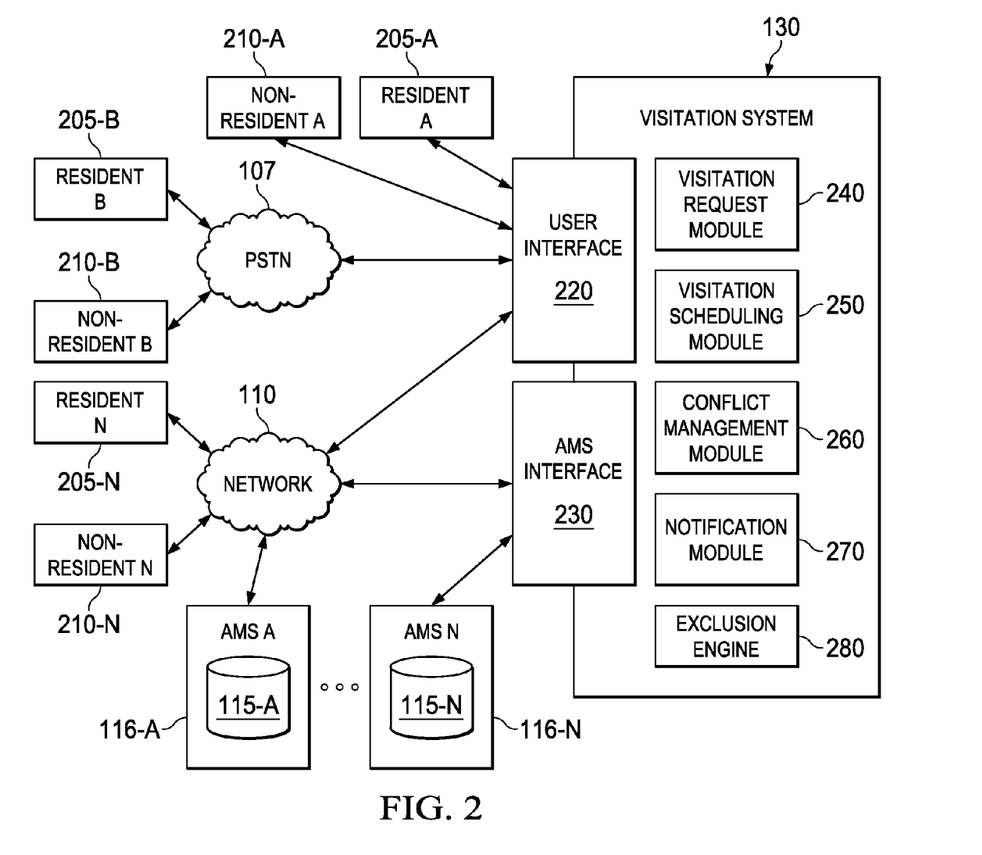
FIG. 2 is a diagram of an example of a visitation system employing an exclusion engine according to some embodiments.

Referring to FIG. 2, a block diagram of visitation system 130 is depicted according to some embodiments. As shown, visitation system 130 includes user interface 220 and AMS interface 230. In some implementations, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services. In other scenarios, resident 205-B and/or non-resident 210-B may interact with user interface 220 via PSTN 107 using an IVR system or the like. Additionally or alternatively, resident 205-N and/or non-resident 210-N may access a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS systems 116A-N either directly or via a computer network such as the Internet 110. As previously noted, each AMS system 116A-N may each include its own database 115A-N, respectively. Generally speaking, databases 115A-N may include any suitable type of application or data structure that may be configured as a data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, conflict management module 260, notification or communication module 270, and exclusion engine (or simply "engine" 280). Visitation request module 240 may be configured to receive one or more visitation scheduling requests, modification requests, or cancellation requests, for example, via user interface 220. Visitation scheduling module 250 may be configured to execute an incoming request, for example, by scheduling a new visitation, modifying a previously scheduled visitation, or canceling the previously scheduled visitation. Conflict management module 260 may be configured to identify conflicts or potential conflicts between or among different requests, and to resolve those conflicts. Notification module 270 may be configured to notify of a particular visitation, modification, cancelation, conflict, etc.

Exclusion engine 280 may be configured to store one or more exclusion rules, exclusion lists (e.g., permissive lists or restrictive lists) or the like, which may be usable by one or more request module 240, visitation scheduling module 250, conflict management module 260, and/or notification module 270 during the course of their respective operations. For example, engine 280 may store one or more exclusion lists that allow or prohibit certain persons to perform a communication scheduling operation. Those lists may be applied, for example, to incoming visitation requests by visitation request module 240. Also, engine 280 may include other rules regarding notifications and/or other operations that may be executed via notification module 270 or conflict management module 260. These, and other techniques, are illustrated in more detail below in connection with FIGS. 4-7.

In various embodiments, modules 220-280 shown in FIG. 2 may represent sets of software routines, logic functions, and/or data structures that are configured to perform operations described herein and particularly with respect to FIGS. 4-7. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Figure 3:
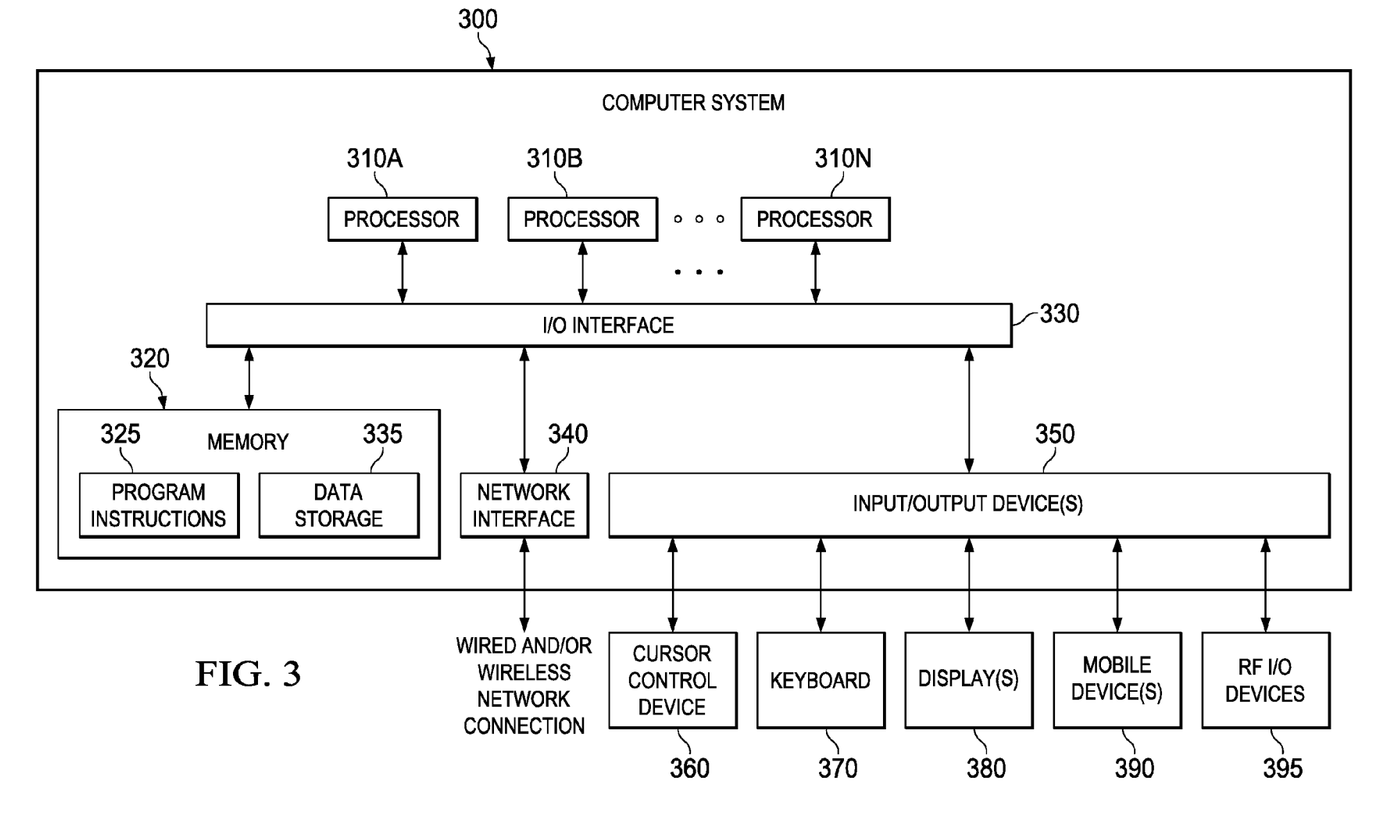
FIG. 3 is a block diagram of an example of a computer system configured to implement various systems and methods described herein according to some embodiments.

As noted above, embodiments of an exclusion engine for electronic communications in controlled-environment facilities may be implemented or executed, at least in part, by one or more computer systems. One such system is illustrated in FIG. 3. In various embodiments, system 300 may be a server, a workstation, a desktop computer, a laptop, a tablet computer, a mobile device, a smart phone, or the like. In some cases, system 300 may be used to implement video visitation system 130.

As illustrated, computer system 300 includes one or more processors 310A-N coupled to a system memory 320 via an input/output (I/O) interface 330. Computer system 300 further includes a network interface 340 coupled to I/O interface 330, and one or more I/O devices 350, such as cursor control device 360, keyboard 370, display(s) 380, mobile device(s) 390, and/or Radio Frequency (RF) I/O devices 395. Each of I/O devices 350 may be capable of communicating with computer system 300, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc. In some embodiments, each of visitation system 130, AMS 116, communication processing system 101, devices 102-104, and/or devices 105, 106, 109, 112, and 113 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 4-7, may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via I/O interface 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

In some embodiments, the various systems described above may be configured to perform certain operations described in FIGS. 4-7. These operations may include, for example, processing a communication request using a particular type of exclusion list (e.g., a permissive list and/or a restrictive list), submitting a communication request to facility personnel or administration, modifying an exclusion list, etc. As noted above, although certain examples described herein deal specifically with video visitation, it should be noted that other types of electronic communications may be used.

Generally speaking, each controlled-environment facility may be given the option to operate as a "permissive list" or a "restrictive list" facility. In some implementations, however, the same facility may operate as a permissive and restrictive list facility simultaneously. For example, in a given facility, a resident or group of residents may have their communications processed using a permissive list, while another resident or group of residents within that same facility may have their communications processed using a restrictive list. Also, for a given resident or group of residents, different types of communications may be subject to different exclusion lists and/or different types of exclusion lists.

As used herein, the term "permissive list" is defined as a list of non-residents of a controlled-environment facility usable in a manner such that the facility requires a non-resident (e.g., friend or family, etc.) to be identified on the permissive list in order to participate in an electronic communication (e.g., video visitation) with a resident of that facility. Conversely, the term "restrictive list" is defined as a list of non-residents of a controlled-environment facility usable in a manner such that, by default, the facility allows any non-resident to automatically participate in communication events with a resident of the facility, unless the non-resident is identified on the restrictive list, in which case the communication is not allowed.

Figure 4:
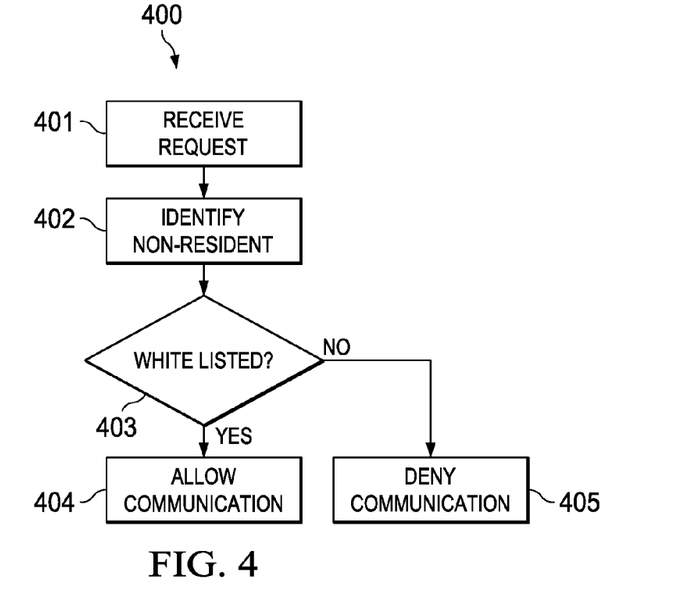
FIG. 4 is a flowchart of an example of a method for using a permissive list according to some embodiments.

Turning now to FIG. 4, a flowchart of an example of method 400 for using a permissive list is depicted. In some embodiments, method 400 may be performed, at least in part, exclusion engine 280 of visitation system 130 of FIG. 2. As shown, at block 401, method 400 may include receiving a request for video visitation from a non-resident of the controlled-environment facility. Such a request may be received, for example, via user interface 220 at visitation request module 240 of visitation system 130. In some cases, the request for visitation may be received in a format such as, for example, via the Internet (e.g., via a web portal, as an HTTP message, or the like), by e-mail, text message, Short Message Service (SMS) communication, telephone call, IVR input, in person at the facility, etc.

In some implementations, the request may include identification information associated with the non-resident (e.g., name, username, personal identification number, driver's license number, social security number, etc.) and/or with the non-resident's device (e.g., Internet Protocol (IP) address, Media Access Control (MAC) address, etc.). Moreover, the request may specify one or more individual residents (e.g., by inmate identification number, by name, by driver's license or social security number, etc.) with whom the non-resident wishes to have the video visitation session(s).

At block 402, exclusion engine 280 of visitation system 130 may parse the request of block 401 to collect the identification information about the non-resident. Then, at block 403, exclusion engine 280 may compare the identification information obtained from the request with other identification information stored in the facilities' permissive list. If there is a match, the communication or request is allowed at block 404. Otherwise the communication or request is denied at block 405.

For sake of illustration, and not by way of limitation, an example of a permissive list is shown in Table I below:

TABLE I

An Example of a Permissive List

| List Type | Permissive |
| --- | --- |
| Facility ID | Prison 123 |
| Resident's ID | Inmate's name, number, etc. |
| Group ID | Group name, category, etc. |
| Communication Type | Video visitation |
| Non-Resident A | Person's name, IP address, etc. |
| . . . | . . . |
| Non-Resident N | Person's name, IP address, etc. |

Referring to Table I, a list may identify the type of list ("permissive"), the facilit(ies) to which the list applies ("prison 123"), and the facility's resident(s) with whom the list is associated (by inmate name, identification number, social security, case number, etc.). Additionally or alternatively, the list may identify a group of residents to whom the permissive list applies (by group name, category, etc.) and/or the types of electronic communication to which the permissive list applies ("video visitation"). Then, the list may identify one or more non-residents of the facility to whom the permissive list applies, and those non-residents may be identified by name, username, identification number, social security number, IP address, MAC address, etc.

Figure 5:
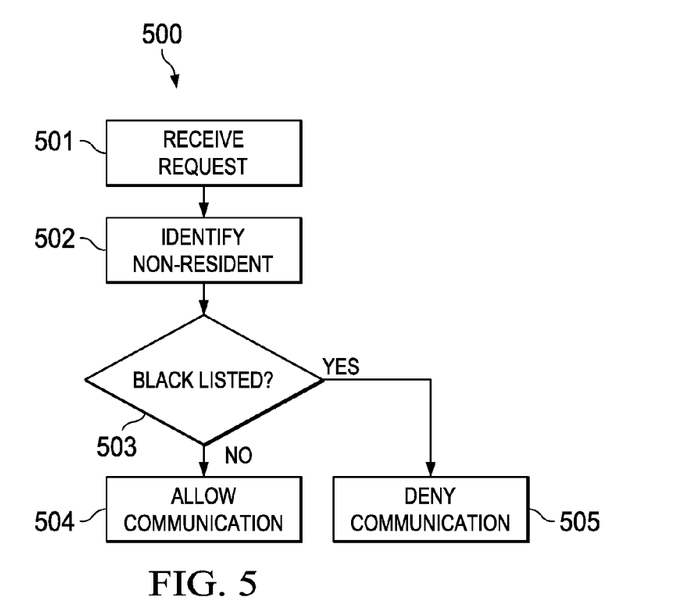
FIG. 5 is a flowchart of an example of a method for using a restrictive list according to some embodiments.

In FIG. 5, a flowchart of an example of method 500 for using a restrictive list is depicted. Similarly as above, method 500 may be performed, at least in part, using exclusion engine 280 of visitation system 130 of FIG. 2. As shown, blocks 501 and 502 are similar to blocks 401 and 402 of FIG. 4. At block 503, exclusion engine 280 may compare the identification information obtained from the request with other identification information stored in the facilities' restrictive list. If there is a match, the communication or request is denied at block 405. Otherwise the communication or request is allowed at block 504.

With respect to FIGS. 4 and 5, although the requests of blocks 401 and 402 are described as having been initiated by a non-resident of the controlled-environment facility, it should be noted that such requests may also be initiated by a resident of the facility. Also, an example of a restrictive list may be structurally similar to that of Table I, but with its "list type" being "restrictive."

In some cases, a permissive and/or restrictive list (either generally referred to as an "exclusion list") may be generated for each resident of the facility. In other cases, however, at least one exclusion list may be shared between two or more residents.

Additionally or alternatively, a first group or category of residents of a controlled-environment facility may be associated with one or more permissive lists, and a second group or category of residents within the same facility may be associated with one or more restrictive lists. Examples of groups or categories of residents include, for instance, general population residents, gang or criminal organization affiliation, a family relationship, a friendship, a reason for incarceration in the controlled-environment facility, and a location of incarceration within the controlled-environment facility (e.g., wing, area, or cell), etc. For instance, if a facility has classified a first group of residents under a first security level (more dangerous), each resident in the first group may be associated with a permissive list (more restrictive); and if the facility has classified a second group of residents under a second security level (a lower level indicating that the group is less dangerous), each resident in the second group may be associated with a restrictive list (less restrictive).

In some implementations, different exclusion lists may be created for the same resident(s) of a controlled-environment facility as a function of the type of electronic communication. For sake of illustration, a facility may elect to use a restrictive list for a telephone communication involving a given resident, and use a permissive list for a video visitation with that same resident. For example, the facility may have determined that security concerns are not as important for telephone communications than for video visitations, and therefore may elect to use a restrictive list approach (less restrictive) for the former and a while list approach for the latter (more restrictive).

Still referring to the foregoing example, assume that a non-resident initiates a request for a video visitation with the resident, and that the non-resident is not identified in the resident's video visitations permissive list or in the resident's telephone communications restrictive list. In this case, exclusion engine 280 of visitation system 130 may determine that the video visitation request should not be allowed because the non-resident is not in the resident's video visitation permissive list, and therefore the non-resident is not allowed to visit the resident. However, exclusion engine 280 may determine that a telephone communication would be allowed because the non-resident is not in the resident's telephone restrictive list, and therefore the non-resident is allowed to call the resident.

Accordingly, visitation system 130 may change the original video visitation request to a telephone communication request so as to allow some form of communication between the resident and non-resident. For instance, notification module 270 may send a message to the resident or non-resident indicating that the video visitation request has not been accepted, but that another type of communication—that is, a telephone call—is suggested and/or has been scheduled.

Figure 6:
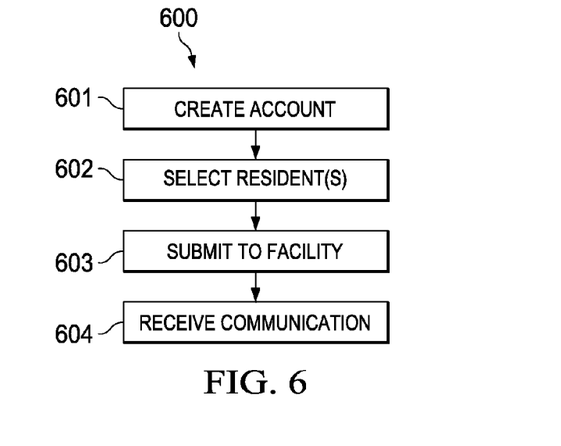
FIG. 6 is a flowchart of an example of a method for submitting a communication request according to some embodiments.

FIG. 6 is a flowchart of an example of method 600 for submitting a communication request. In some embodiments, method 600 may be performed, at least in part, by a non-resident of a controlled-environment facility operating a computer system such as described in FIG. 3. As shown, in block 601, method 600 may include creating an account. For example, the non-resident (e.g., a family member, friend, etc.) may create a video visitation account with visitation system 130. To create such an account, the non-resident may provide certain identification information (e.g., name, address, date of birth, social security number, PIN number, etc.) that may later allow facility personnel to approve the account and/or communication requests. Additionally or alternatively, the computer system operated by the non-resident may also be identified by Internet Protocol (IP) address, Media Access Control (MAC) address, or the like.

In cases where visitation system 130 serves two or more facilities, the non-resident may select one or more facilities of interest, for instance, during the account creation process. After the account has been created, the non-resident may simply "logon" to his or her existing account for subsequent request submissions.

At block 602, method 600 may include selecting a resident with whom to have a communication session. For example, visitation system 130 may access AMS 116 for the selected facility and provide a list of available residents. In some cases, when selecting the resident, the non-resident may have the option of also selecting the type of electronic communication desired (e.g., video visitation, telephone communication, chat, etc.). Additionally or alternatively, the non-resident may have the option of selecting a date and time for the communication, which may sometimes depend upon the selected resident's availability, which in turn may also be obtained from AMS 116.

At block 603, method 600 may include submitting a request to the facility. The submission may be made, for example, via an HTTP command, via an email generated by visitation system 130, etc. In some implementations, in response to having received the request, facility personnel may then perform the method of FIG. 7.

Then, at block 604, method 600 may include receiving a communication from visitation system 130 indicating whether the request has been approved, whether a different type of communication has been suggested, etc. Such a communication may be presented to the non-resident in the form of an automated phone call, a web page, an email, an SMS text, etc.

Figure 7:
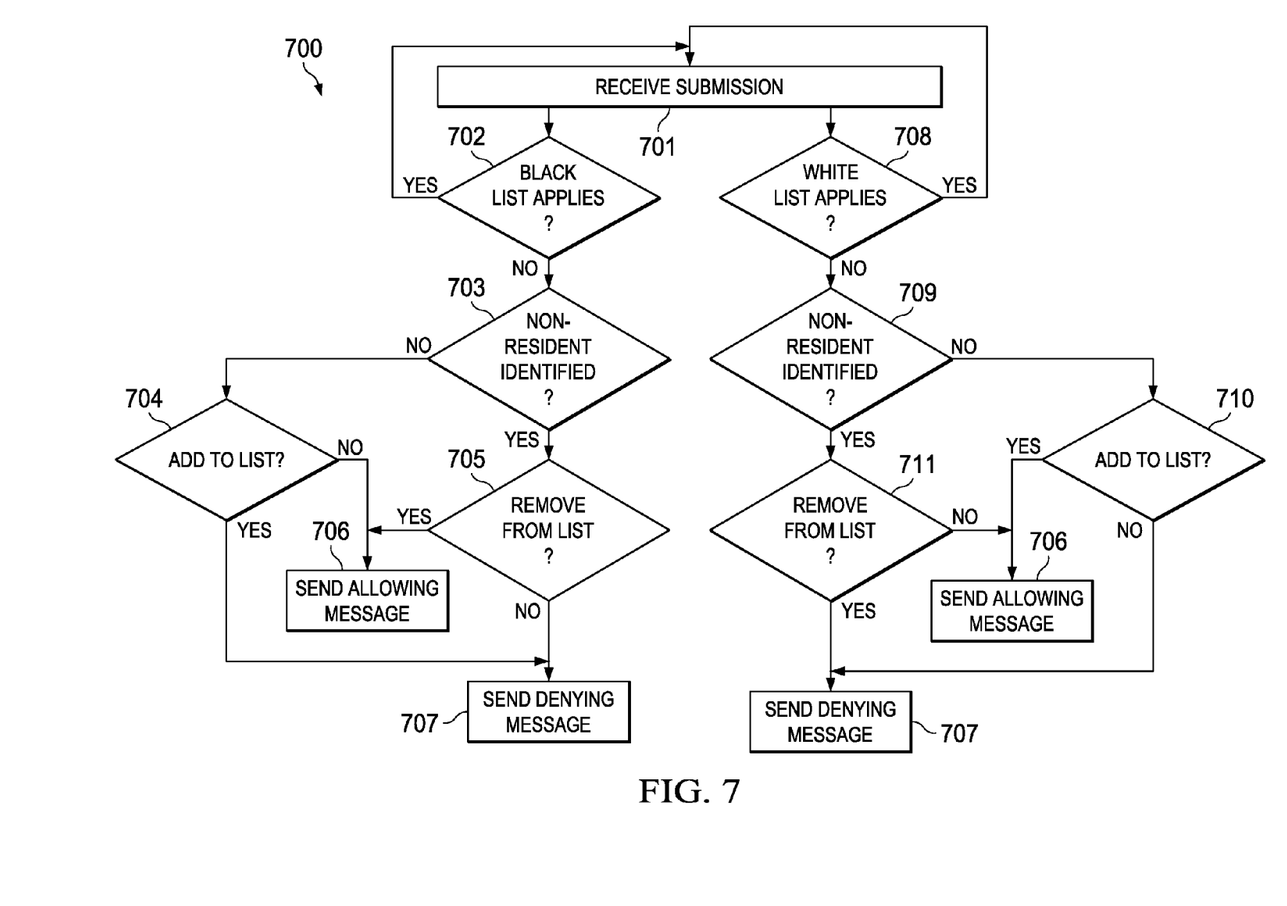
FIG. 7 is a flowchart of an example of a method for processing the communication request according to some embodiments.

FIG. 7 is a flowchart of an example of method 700 for processing a communication request according to some embodiments. In some embodiments, method 700 may be performed, at least in part, by personnel of a controlled-environment facility (e.g., a facility administrator, officer, etc.) operating a computer system such as described in FIG. 3

At block 701, method 700 may include receiving a request for a communication that has been submitted by a non-resident of the controlled-environment facility. For example, the request may have been created as described above in FIG. 6, and it may identify a resident of the facility. At block 702, method 700 may include determining whether a restrictive list applies to the request. If the facility is a restrictive list facility, or if otherwise the exclusion list associated with the resident, type of communication, and/or to a group to which the resident belongs is a restrictive list, then placing the non-resident in the restrictive list means that the resident is not allowed to have the communication with the resident. The determination of block 702 may involve, for example, determining the identity of the resident, the type of communication being sought, etc. If so, block 703 includes determining whether the non-resident is on the restrictive list.

If the non-resident is not on the restrictive list, block 704 may include determining whether to add the non-resident to the restrictive list. Conversely, if the non-resident is on the restrictive list, block 705 may include determining whether to remove the non-resident from the restrictive list.

If the non-resident is not originally on the restrictive list and is not added to the list at block 704, method 700 may include sending an allowing message to the non-resident at block 706. If the non-resident is not originally on the restrictive list but is then added to the list at block 704, method 700 may include sending a denying message to the non-resident at block 707. If the non-resident is originally on the restrictive list and is not removed from the list at block 705, method 700 may include sending a denying message to the non-resident at block 707. If the non-resident is originally on the restrictive list but is then removed from the list at block 705, method 700 may include sending an allowing message to the non-resident at block 706.

At block 708, method 700 may include determining whether a permissive list applies to the request. If the facility is a permissive list facility, or if otherwise the exclusion list associated with the resident, type of communication, and/or to a group to which the resident belongs is a permissive list, then placing the non-resident in the permissive list means that the resident is allowed to have the communication with the non-resident. The determination of block 708 may involve, for example, determining the identity of the resident, the type of communication being sought, etc. If so, block 709 may include determining whether the non-resident is on the permissive list. If not, method 700 returns to block 701.

If the non-resident is not on the permissive list, block 710 may include determining whether to add the non-resident to the permissive list. Conversely, if the non-resident is on the permissive list, block 711 may include determining whether to remove the non-resident from the permissive list.

If the non-resident is not originally on the permissive list and is not added to the list at block 710, method 700 may include sending a denying message to the non-resident at block 707. If the non-resident is not originally on the permissive list but is then added to the list at block 710, method 700 may include sending an allowing message to the non-resident at block 706. If the non-resident is originally on the permissive list and is not removed from the list at block 711, method 700 may include sending an allowing message to the non-resident at block 706. If the non-resident is originally on the permissive list but is then removed from the list at block 711, method 700 may include sending a denying message to the non-resident at block 707

In some embodiments, the operations of blocks 701-711 may be performed manually by facility personnel. For example, a human operator may receive the communication request and determine that the non-resident's identity does not match the identity of the resident's known family members or friends, and therefore may place the non-resident on a restrictive list, or remove the non-resident form a permissive list. Alternatively, the human operator may determine that the non-resident's identity matches the identity of the resident's known family members or friends, and therefore may place the non-resident on a permissive list, or remove the non-resident from a restrictive list. Other evaluation criteria that may be used to determine whether to place the non-resident on an exclusion list may include, for example, whether there is a criminal affiliation between the non-resident and the resident, whether there is an indication of harassment activities between the non-resident and the resident, general facility visitation policies, etc. In other embodiments, the operations of blocks 701-711 may be at least partially automated and performed by visitation system 130 in the absence of human intervention.

In some implementations, one or more of the operations of FIG. 7 may not be performed for every request received. For example, in some cases, once a non-resident has been placed on a permissive list, subsequent requests by that same non-resident may be automatically approved. Also, in some cases, the allowing message may indicate to the non-resident that the original request has been approved. Conversely, the denying message may indicate to the non-resident that the request has been denied. In some cases, the request may be evaluated against other parameters—e.g., other types of communication that may have other exclusion lists associated therewith. In those scenarios, the denying message may suggest alternative types of communications that the non-resident may be allowed to perform with the selected resident.

It should be understood that the various operations described herein, particularly in connection with FIGS. 4-7, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
creating, via one or more computer systems, two or more exclusion lists for a resident of a controlled-environment facility, a first communication type exclusion list associated with at least a first type of electronic communication and a second communication type exclusion list associated with at least one second type of electronic communication;
receiving, at the one or more computer systems, a request for an electronic communication between the resident and a non-resident of the controlled-environment facility;
determining, via the one or more computer systems, whether one of the two or more exclusion lists adopted by the controlled-environment facility allows the non-resident to communicate with the resident, the exclusion list being either a permissive list or a restrictive list;
identifying the communication as the first type of communication and in response to the identification, determining whether the first type exclusion list allows the non-resident to communicate with the resident, and in response to a determination that the first type of communication is allowed, notifying at least one of the resident or non-resident, via a message; and
in response to the first type of communication not having been allowed, determining whether the second type exclusion list allows the non-resident to communicate with the resident, and in response to a determination that the second type of communication is allowed, notifying at least one of the resident or non-resident, via a message.

2. The method of claim 1, wherein the controlled-environment facility is a jail or prison, and wherein the resident is an inmate.

3. The method of claim 1, wherein the electronic communication is selected from the group consisting of: a telephone call, a video visitation session, an electronic chat session, a video telephone call, a text message, a prerecorded video message, and an email.

4. The method of claim 1, wherein the exclusion list is a permissive list, and wherein the permissive list identifies one or more non-residents that are allowed to communicate with the resident.

5. The method of claim 4, wherein:
in response to the non-resident being identified in the permissive list, determining whether the exclusion list allows the non-resident to communicate with the resident includes determining that the exclusion list allows the non-resident to communicate with the resident; and
in response to the non-resident not being identified in the permissive list, determining whether the exclusion list allows the non-resident to communicate with the resident includes determining that the exclusion list does not allow the non-resident to communicate with the resident.

6. The method of claim 1, wherein the exclusion list is a restrictive list, and wherein the restrictive list identifies one or more non-residents that are not allowed to communicate with the resident.

7. The method of claim 6, wherein:
in response to the non-resident being identified in the restrictive list, determining whether the exclusion list allows the non-resident to communicate with the resident includes determining that the exclusion list does not allow the non-resident to communicate with the resident; and
in response to the non-resident not being identified in the restrictive list, determining whether the exclusion list allows the non-resident to communicate with the resident includes determining that the exclusion list allows the non-resident to communicate with the resident.

8. The method of claim 1, further comprising creating, via the one or more computer systems, an exclusion list for each resident of the controlled-environment facility, each exclusion list being of the same type.

9. The method of claim 1, further comprising creating, via the one or more computer systems, exclusion lists for a plurality of residents of the controlled-environment facility, a first portion of the plurality of residents associated with one or more permissive lists, and a second portion of the plurality of residents associated with one or more restrictive lists.

10. The method of claim 9, wherein at least one of the exclusion lists is shared between two or more of the plurality of residents.

11. The method of claim 10, wherein the two or more of the plurality of residents have one or more common characteristics selected from the group consisting of: a gang affiliation, a family relationship, a friendship, a reason for incarceration in the controlled-environment facility, and a location of incarceration within the controlled-environment facility.

12. A tangible computer-readable non-transitory medium having program instructions stored thereon that, upon execution by a computer system, cause the computer system to:
create two or more exclusion lists for a resident of a controlled-environment facility, a first communication type exclusion list associated with at least a first type of electronic communication and a second communication type exclusion list associated with at least one second type of electronic communication;
receive a request for an electronic communication between a resident and a non-resident of a controlled-environment facility;
determine if one of the two or more exclusion lists adopted by the controlled-environment facility allows the non-resident to communicate with the resident;
identify the communication as the first type of communication and, in response to the identification, determine whether the first type exclusion list allows the non-resident to communicate with the resident, and in response to a determination that the first type of communication is allowed notify at least one of the resident or non-resident; and
in response to the first type of communication not having been allowed, determine that the second exclusion list allows the non-resident to communicate with the resident, and notify at least one of the resident or the non-resident that the second type of electronic communication is allowed.

13. The tangible computer-readable non-transitory medium of claim 12, wherein the exclusion list is of a type selected from the group consisting of: a permissive list, and a restrictive list.

14. The tangible computer-readable non-transitory medium of claim 13, wherein the permissive list identifies one or more non-residents that are allowed to communicate with the resident, and wherein the restrictive list identifies one or more non-residents that are not allowed to communicate with the resident.

15. A electronic communication system, comprising:
at least one processor; and
a memory coupled to the at least one processor, the memory configured to store program instructions executable by the at least one processor to cause the electronic communication system to:
create two or more exclusion lists for a resident of a controlled-environment facility, a first communication type exclusion list associated with at least a first type of electronic communication and a second communication type exclusion list associated with at least one second type of electronic communication;
receive a request for an electronic communication between a resident and a non-resident of a controlled-environment facility;
determine if one of the two or more exclusion lists adopted by the controlled-environment facility allows the non-resident to communicate with the resident;
identify the communication as the first type of communication and, in response to the determination, determine whether the first type exclusion list allows the non-resident to communicate with the resident, and in response to a determination that the first type of communication is allowed transmit to the resident and/or the non-resident a notification message the communication is allowed; and
in response to the first type of communication not having been allowed, determine that the second exclusion list allows the non-resident to communicate with the resident, and notifying at least one of the resident or the non-resident that the second type of electronic communication is allowed.

16. The electronic communication system of claim 15, wherein a permissive exclusion list identifies one or more non-residents that are allowed to communicate with the resident, and wherein a restrictive exclusion list identifies one or more non-residents that are not allowed to communicate with the resident.

17. The tangible computer-readable non-transitory medium of claim 12, wherein the program instructions further cause the computer system to:
transmit an indication of the determinations to personnel of the controlled-environment facility;
receive an indication of a revision to any of the exclusion lists made by the personnel; and
modify the exclusion lists according to the revision.

18. The method of claim 1, wherein the program instructions further cause the computer system to:
transmit an indication of the determinations to personnel of the controlled-environment facility;
receive an indication of a revision to any of the exclusion lists made by the personnel; and
modify the exclusion lists according to the revision.

19. The tangible computer-readable non-transitory medium of claim 17, wherein the program instructions further cause the computer system to notify at least one of the resident or non-resident of modification of the exclusion list according to the revision.

20. The electronic communication system of claim 15, wherein the program instructions further cause the electronic communication system to:
transmit an indication of the determinations to personnel of the controlled-environment facility;
receive an indication of a revision to any of the exclusion lists made by the personnel; and
modify the exclusion lists according to the revision.

* * * * *